United States Patent
Ono

(10) Patent No.: US 6,611,123 B2
(45) Date of Patent: Aug. 26, 2003

(54) SERVO CONTROL APPARATUS AND GAIN ADJUSTING METHOD

(75) Inventor: Takayuki Ono, Osaka (JP)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 10/086,626

(22) Filed: Mar. 4, 2002

(65) Prior Publication Data
US 2002/0125850 A1 Sep. 12, 2002

(30) Foreign Application Priority Data
Mar. 2, 2001 (JP) .......................................... 2001-058896

(51) Int. Cl.⁷ ........................................... G05D 23/275
(52) U.S. Cl. ................... 318/632; 318/560; 318/629; 318/609; 318/610; 369/44.25; 369/44.29; 369/44.32; 700/37; 700/41; 700/42; 700/43
(58) Field of Search ............................... 318/609, 610, 318/629, 632, 560; 369/44.29, 44.32, 44.35, 44.36, 44.25; 700/37, 41–43

(56) References Cited

U.S. PATENT DOCUMENTS

| | | | | |
|---|---|---|---|---|
| 4,168,916 A | * | 9/1979 | Yamada et al. | 366/116 |
| 5,053,724 A | * | 10/1991 | Ogino et al. | 331/14 |
| 5,130,963 A | * | 7/1992 | Kusano et al. | 369/44.28 |
| 5,157,597 A | * | 10/1992 | Iwashita | 364/157 |
| 5,263,113 A | * | 11/1993 | Naitoh et al. | 388/815 |
| 5,298,973 A | * | 3/1994 | Fukazawa et al. | 356/368 |
| 5,621,349 A | * | 4/1997 | Kim et al. | 329/325 |
| 5,672,949 A | * | 9/1997 | Ward | 318/609 |
| 5,768,227 A | * | 6/1998 | Baba | 369/44.28 |
| 6,127,793 A | * | 10/2000 | Kerner | 318/561 |

FOREIGN PATENT DOCUMENTS

JP          05-217315          8/1993

* cited by examiner

Primary Examiner—Bentsu Ro
Assistant Examiner—Rina I. Duda
(74) Attorney, Agent, or Firm—Crowell & Moring LLP

(57) ABSTRACT

A disk apparatus includes a DSP (digital signal processor), and a DSP core of the DSP receives a feedback input from a pick-up, and generates a focus control pulse and a tracking control pulse. That is, a focus servo loop and a tracking servo loop are formed. The DSP core detects a phase difference between a sine wave of a target frequency and a sine wave superposed on an input signal, and adjusts a gain of the servo loop so as to bring a DC component of a correlation signal correlated with the phase difference to a 0 level. More specifically, if the DC component of the correlation signal exceeds a predetermined threshold value, an adjusting amount of the gain is rendered large, and greatly brought closer to the 0 level. On the other hand, if the DC component of the correlation signal is equal to or less than the predetermined threshold value, the adjusting amount of the gain is rendered small, and gradually brought to the 0 level.

9 Claims, 9 Drawing Sheets (A) CASE OF PHASE DIFFERENCE 0 DEGREE (B) CASE OF PHASE DIFFERENCE 90 DEGREES (C) CASE OF PHASE DIFFERENCE 180 DEGREES

SERVO CONTROL APPARATUS AND GAIN ADJUSTING METHOD

BACKGROUND OF THE INVENTION

1. Field of the Invention

The present invention relates to a servo control apparatus and a gain adjusting method. More specifically, the present invention relates to a servo control apparatus and a gain adjusting method which determines a gain of a focus servo loop or a tracking servo loop of a disk apparatus, for example.

2. Description of the Prior Art

One example of such a kind of servo control apparatus is disclosed in, for example, Japanese Patent Laying-open No. 5-217315 [G11B 21/10, G11B 7/09] laid-open on Aug. 27, 1993. As shown in FIG. 10, in this servo control apparatus 1, a gain automatic adjusting system 2 produces a sine wave in a VCO calculating portion (VCO) 3, and adds it to an addition point 5 in a state where a servo loop is closed. Furthermore, by passing an output of a servo operation portion 4 through a band-pass filter portion (BPF) 6 only a required frequency component is extracted, and the required frequency component is multiplied with the sine wave from the VCO calculating portion 3 in a multiplication portion 7. Then, a multiplied output is applied to a notch filter portion (NFT) 8, and its unnecessary frequency component is removed, and a gain of the servo operation portion 4 is increased or decreased in a gain calculating portion 9 in such a manner that the multiplied output becomes a predetermined value.

In this prior art, however, in the gain calculating portion 9, a value of a variable LSTEP is changed, and the gain is increased or decreased by the variable LSTEP, and the variable LSTEP is changed by a dichotomizing method so as to gradually decrease a varying width (increase or decrease) of the gain, and thus, the number of adjustment times (increase or decrease) becomes large, and therefore, it requires a long time until an appropriate gain is adjusted.

SUMMARY OF THE INVENTION

Therefore, it is a primary object of the present invention to provide a servo control apparatus and a gain adjusting method of a servo loop, which is capable of adjusting a gain in a short time.

The present invention is a servo control apparatus which determines a reproduction gain of a focus servo loop or a tracking servo loop of a disk apparatus, and comprises: a phase difference detecting means for detecting a phase difference between an input sine wave and a sine wave being fed-back; an adjusting means for adjusting a loop gain of a servo loop to determine the reproduction gain according to the phase difference; a generating means for generating a correlation signal correlated with the phase difference at every time that the loop gain is adjusted by the adjusting means; a determining means for determining whether or not a DC component of the correlation signal generated by the generating means exceeds a predetermined threshold value; an adjusting amount setting means for setting an adjusting amount of the loop gain to a first predetermined amount when it is determined that the DC component of the correlation signal exceeds the predetermined threshold value, and setting the adjusting amount to a second predetermined amount smaller than the first predetermined amount when it is determined that the DC component of the correlation signal is equal to or smaller than the predetermined threshold value; a polarity detecting means for detecting a polarity of the DC component of the correlation signal generated by the generating means; a polarity comparing means for comparing the polarity of this time detected by the polarity detecting means and the polarity of last time; and a gain determining means for determining the loop gain adjusted last time or the loop gain adjusted this time as the reproduction gain when a comparing result of the polarity comparing means indicates a reverse in polarity and also the second predetermined amount is set.

In an aspect, the present invention is a servo control apparatus which determines a reproduction gain of a focus servo loop or a tracking servo loop of a disk apparatus, and comprises: a phase difference detecting means for detecting a phase difference between an input sine wave and a sine wave being fed-back; an adjusting means for adjusting a loop gain of a servo loop to determine the reproduction gain according to the phase difference; a determining means for determining whether or not a DC component of a correlation signal correlated with the phase difference exceeds a predetermined threshold value; and an adjusting amount setting means for setting an adjusting amount of the loop gain in response to a determining result of the determining means.

The present invention is a gain adjusting method in a servo control apparatus which determines a reproduction gain of a focus servo loop or a tracking servo loop of a disk apparatus, comprising following steps of: (a) detecting a phase difference between an input sine wave and a sine wave being fed-back; (b) generating a correlation signal correlated with the phase difference; (c) determining whether or not a DC component of the correlation signal exceeds a predetermined threshold value; and (d) adjusting a loop gain of a servo loop for determining the reproduction gain with a first predetermined amount when it is determined that the DC component of the correlation signal exceeds the predetermined threshold value, and adjusting the loop gain with a second predetermined amount smaller than the first predetermined amount when it is determined that the DC component of the correlation signal is equal to or less than the predetermined threshold value.

The servo control apparatus is adapted to a disk apparatus which reproduces an optical disk such as a CD, a DVD, and etc., for example, and determines a reproduction gain of a servo loop (servo loop for reproduction) such as a focus servo loop and a tracking servo loop. In the servo control apparatus, for example, a sine wave of a predetermined frequency (target frequency) is input as a disturbance. The sine wave is superposed on a focus control voltage or a tracking control voltage applied from a pick-up as an input signal (feedback signal), and applied to the pick-up after being subjected to a phase compensation or a gain compensation. The feedback signal is filtered a band-pass filter (BPF) having a center frequency being set to the target frequency, and a component of the target frequency is extracted. That is, a sine wave which is fed-back is obtained.

The phase difference detecting means detects a phase difference between the sine wave of the target frequency and the sine wave being fed-back. The gain adjusting means adjusts a loop gain of a servo loop (servo loop for determination) for determining a reproduction gain of the servo loop for reproduction in accordance with the phase difference. More specifically, a correlation signal correlated with the phase difference is generated at every time that the loop gain is adjusted, and it is determined whether or not a DC component of the correlation signal exceeds a predetermined threshold value. If the DC component of the correlation signal exceeds the predetermined threshold value, the loop gain is adjusted (increased or decreased) with a first predetermined amount set by the adjusting amount setting means. On the other hand, if the DC component of the correlation signal is equal to or less than the predetermined threshold value, the loop gain is increased or decreased with a second predetermined amount smaller than the first predetermined amount set by the adjusting amount setting means. That is, the loop gain is increased or decreased in such a manner that the DC component of the correlation signal is rendered 0 level (control target value), and in a case that the DC component of the correlation signal is greatly distant from the 0 level, the loop gain is increased or decreased by an adjusting amount of the first predetermined amount, and in a case that the DC component of the correlation signal becomes closer to a vicinity of the 0 level, the loop gain is increased or decreased with the second predetermined amount.

While the loop gain is thus adjusted, a polarity of the DC component of the correlation signal is detected by the polarity detecting means for each time that the correlation signal is generated. Furthermore, a comparison is made by the polarity comparing means between the polarity of the DC component of the correlation signal detected this time and the polarity of the DC component of the correlation signal last time, and if a comparison result indicates a reverse in polarity and also the adjusting amount of the loop gain is the second predetermined amount, a reproduction gain of the servo loop for reproduction is decided to the loop gain adjusted last time by the gain determining means or the loop gain adjusted this time. That is, in a case that the polarity of the DC component of the correlation signal becomes a reverse polarity depending upon before or after the gain adjustment, it is possible to say that the DC component of the correlation signal crosses the 0 level (control target value), and therefore, the DC component is the closest to the 0 level if the loop gain before or after the gain adjustment is set into the servo loop for reproduction. Therefore, the loop gain adjusted last time or the loop gain adjusted this time is determined (adopted) as the reproduction gain.

According to the present invention, in a case that the DC component of the correlation signal is more than the predetermined threshold value, the gain is greatly increased or decreased, and in contrary, if the DC component is equal to or less than the predetermined threshold value, an increasing or decreasing width of the gain is rendered small, and accordingly, it is possible to adjust the gain within a short time.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
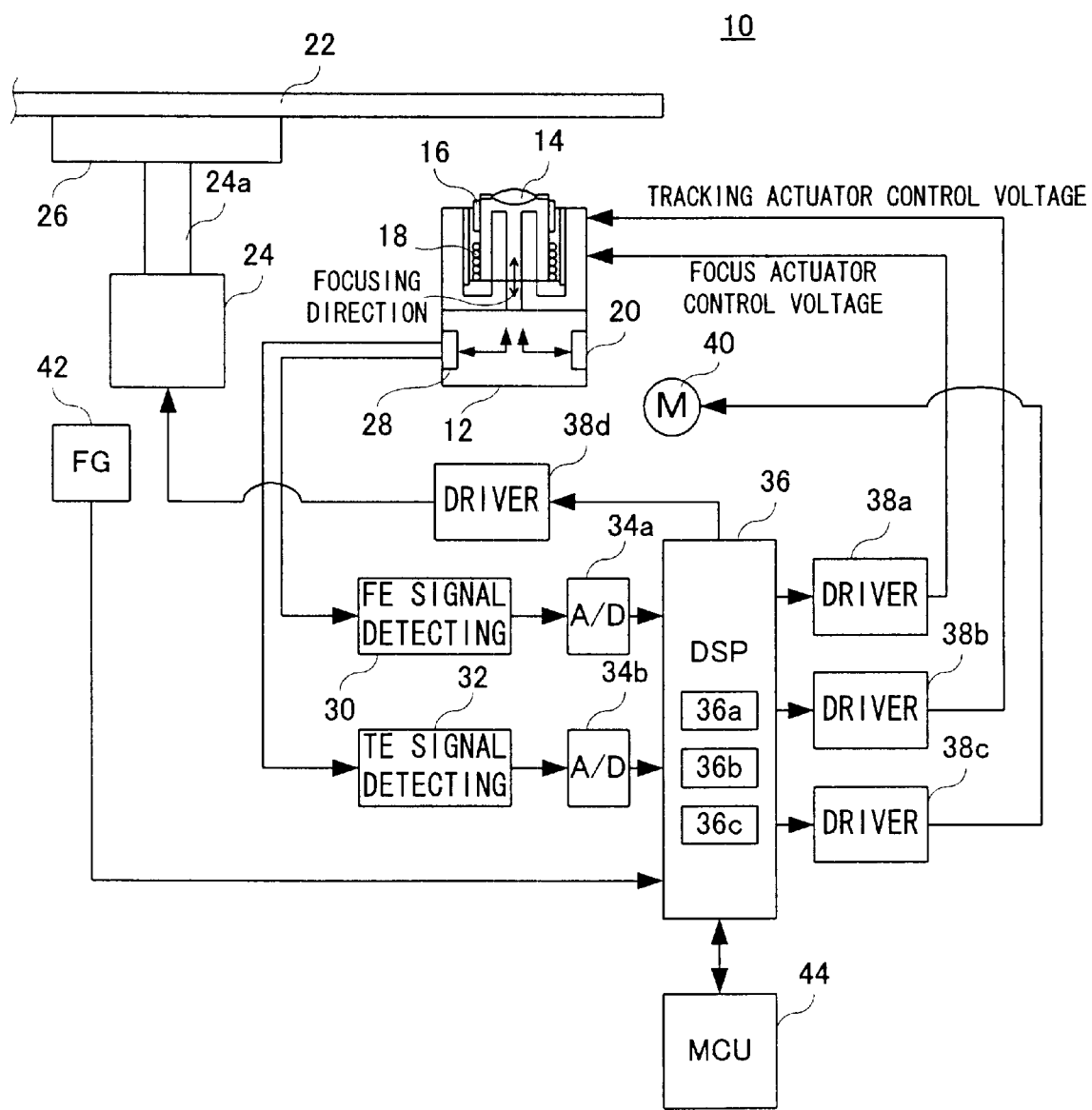
FIG. 1 is an illustrative view showing structure of one embodiment of the present invention.

Referring to FIG. 1, a disk apparatus 10 of this embodiment is capable of reproducing an optical disk (hereinafter briefly referred to as a "disk") such as a DVD, CD, and etc. and includes a pick-up 12. The pick-up 12 is provided with an objective lens 14. The objective lens 14 is a lens of a two-focal-point lens system, for example, and supported by a tracking actuator 16 and a focus actuator 18. In addition, the pick-up 12 includes a laser diode (LD) 20, and a laser beam output from the LD 20 is converged by the objective lens 14 and incident on a recording surface of a disk 22.

More specifically, if the disk 22 is a DVD, a transmitted light (zero-order light) which transmitted the objective lens 14 is incident on a recording surface of the DVD, and if the disk 22 is a CD, a diffraction light (primary-order light) which diffracted the objective lens 14 is incident on a recording surface of the CD. Therefore, a signal recorded on the disk 22 is read (reproduced).

Furthermore, the disk 22 is attached to a turntable 26 fixedly provided on a rotation shaft 24a of a spindle motor 24, and rotated according to a rotation of the spindle motor 24. In this embodiment, the disk 22 is a disk in a CLV (constant linear velocity) system, and the number of rotations of the disk 22 (spindle motor 24) is decreased in relation to a movement of the pick-up 12 from an inner periphery to an outer periphery of the disk 22.

A reflection light from the recording surface passes the aforementioned objective lens 14, and is incident on a light detector 28. An output of the light detector 28 is input to a focus error (FE) signal detecting circuit 30 and a tracking error (TE) signal detecting circuit 32.

An FE signal is detected in the FE signal detecting circuit 30, and an TE signal is detected in the TE signal detecting circuit 32. The TE signal and the TE signal are input to a DSP 36 via an A/D converter 34a and an A/D converter 34b, respectively.

The DSP 36 controls respective circuit components under an instruction of a microcomputer unit (MCU) 44 which functions as a system control microcomputer, and carries out a focus servo process on the basis of the FE signal, and carries out a tracking servo process on the basis of the TE signal, for example.

More specifically, a pulse (focus control pulse) to control the focus actuator 18 is generated by the focus servo process, and the focus control pulse is converted into a focus actuator control voltage in a focus actuator driver 38a (hereinafter briefly referred to as a "driver"), and applied to the focus actuator 18.

In addition, a pulse (tracking control pulse) to control the tracking actuator 16 is produced by the tracking servo process, and the tracking control pulse is converted into a tracking actuator control voltage in a tracking actuator driver 38b (hereinafter briefly referred to as a "driver"), and applied to the tracking actuator 16.

That is, a movement (position) of the objective lens 14 in an optical axis direction (focusing direction) is controlled by the focus actuator control voltage, and a movement (position) of the objective lens 14 in a radius direction (radius direction of the disk 22) is controlled by the tracking actuator control voltage.

Furthermore, a pulse (thread control pulse) to drive a thread motor 40 is generated by a thread servo process, and the thread control pulse is converted into a thread control voltage in a thread driver (driver) 38c which is then applied to the thread motor 40. In addition, the thread control pulse is a PWM signal, and a rotation velocity and a rotation direction of the thread motor 40 is controlled by the PWM signal, and the pick-up 12 coupled to a rotation shaft (not shown) of the thread motor 40 through a rack and pinion system or a ball screw mechanism is caused to move in a radius direction (radial direction) of the disk 22.

Still furthermore, a pulse (rotation control pulse) to rotate the spindle motor 24 is generated by a rotation servo process, and the rotation control pulse is converted into a rotation control voltage a the spindle driver (driver) 38d, and applied to the spindle motor 24. The rotation control pulse is also a PWM signal, and a rotation velocity of the spindle motor 24 is controlled by the PWM signal.

In addition, in a vicinity of the spindle motor 24, there is provided a frequency tacho-generator (FG) 42 which generates a pulse (FG pulse) related to the number of rotation of the spindle motor 24. The FG pulse generated by the FG 42 is input to the DSP 36. Therefore, the DSP 36 detects the number of rotation of the spindle motor 24 on the basis of the FG pulse from the FG 42 after the spindle motor 24 starts (starts-up) to rotate, thereby to apply the detected rotation number to the MCU 44, and also to generate a rotation control pulse in order for the spindle motor 24 to rotate at a desired rotation number. Therefore, it is possible to appropriately rotate the disk 22 of the CLV system.

In such the disk apparatus 10, a DSP core 36a provided in the DSP 36 generates the focus control pulse and the tracking control pulse. As described above, the focus control pulse and the tracking control pulse are converted into a focus control voltage and a tracking control voltage in drivers 38a and 38b, respectively, and applied to the focus actuator 18 and the tracking actuator 16.

On the other hand, although omitted in FIG. 1, the DSP 36 detects (obtains) an actual focus control voltage and an actual tracking control voltage from the pick-up 12, that is, the focus actuator 18 and the tracking actuator 16 via an A/D converter different from the A/D converters 34a and 34b.

Figure 2:
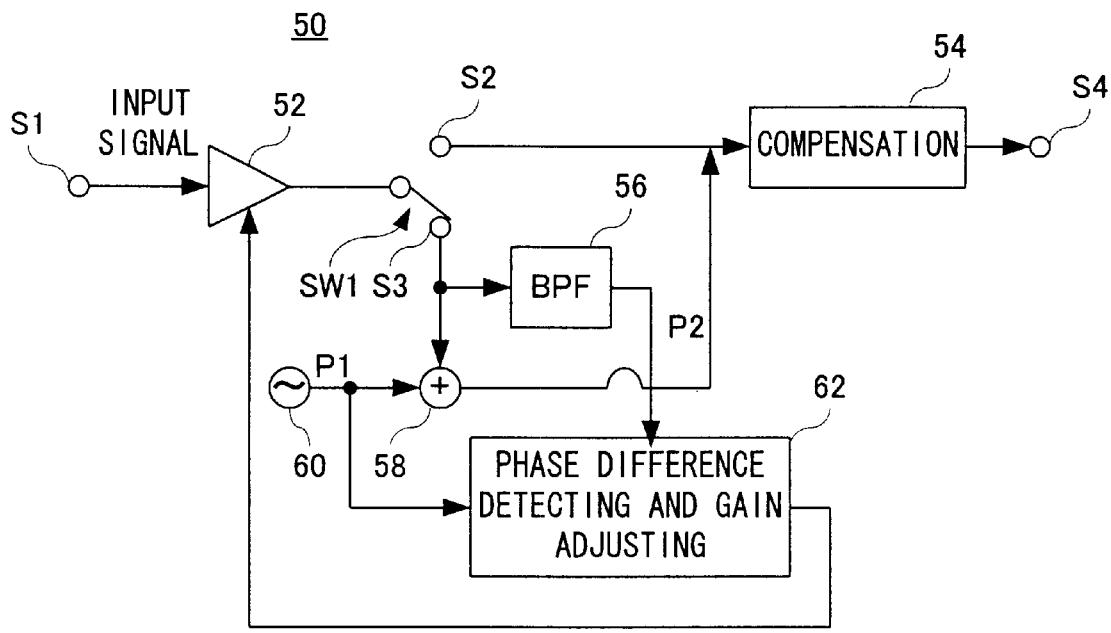
FIG. 2 is a block diagram showing functional structure of a servo control apparatus.

That is, a focus servo loop and a tracking servo loop are formed. A servo control apparatus 50 constituting such the servo loop can be illustrated in functional structure as shown in FIG. 2. Note that the servo control apparatus 50 is realized by a software in the DSP core 36a provided within the DSP 36.

As shown in FIG. 2, the servo control apparatus 50 includes a gain-adjustable amplifier 52 such as an operational amplifier, and an input signal (fed-back signal) is applied to the amplifier 52 via an input terminal S1. Note that as described above, the input signal is output from the pick-up 12, and a digitally converted focus actuator control voltage or a digitally converted tracking actuator control voltage.

The input signal is subjected to a process such as a phase compensation, a gain compensation, and etc. in a compensation portion 54 via a switch SW1 after amplified by the amplifier 52, and output via an output terminal S4. That is, the aforementioned focus control pulse or the tracking control pulse are output from the output terminal S4. In addition, the input signal is input to a band-pass filter (BPF) 56 and an adder 58 via the switch SW1 after amplified by the amplifier 52.

The switch SW1 is a selection means to be switched depending upon whether or not to adjust a gain of the amplifier 52, that is, whether or not to determine a gain at a time of reproduction (reproduction gain), and switched to a terminal S2 after the reproduction gain is determined. On the other hand, in determining the reproduction gain, the switch SW1 is switched to a terminal S3. Therefore, in a case that the switch SW1 is switched to the terminal S2, a servo loop for reproduction is formed, and in a case that the switch SW2 is switched to the terminal S3, a servo loop for determining the reproduction gain is formed.

Hereinafter, in order to be easily understood, a gain of the servo loop for reproduction is referred to as a reproduction gain, and a gain of the servo loop for determining the reproduction gain is referred to as a loop gain.

A sine wave continuously generated at a predetermined frequency (target frequency) f by a sine wave generator 60 is also input to the adder 58. That is, the adder 58 adds the input signal (amplified signal) amplified by the amplifier 52 and the sine wave to each other, and an output (addition result) of the adder 58 is output via the compensation portion 54.

Note that in this embodiment, the target frequency f is set to 2 kHz.

The servo control apparatus 50 also includes a phase difference detecting and gain adjusting portion 62, and an output signal P1 (sine wave) of the sine wave generator 60 and an output signal P2 of the BPF 56 are input to the phase difference detecting and the gain adjusting portion 62. Therefore, the phase difference detecting and the gain adjusting portion 62 detects a phase difference between the output signal P1 and the output signal P2, and generates and outputs an adjusting signal to adjust the loop gain of the amplifier 52 according to the phase difference.

Figure 3:
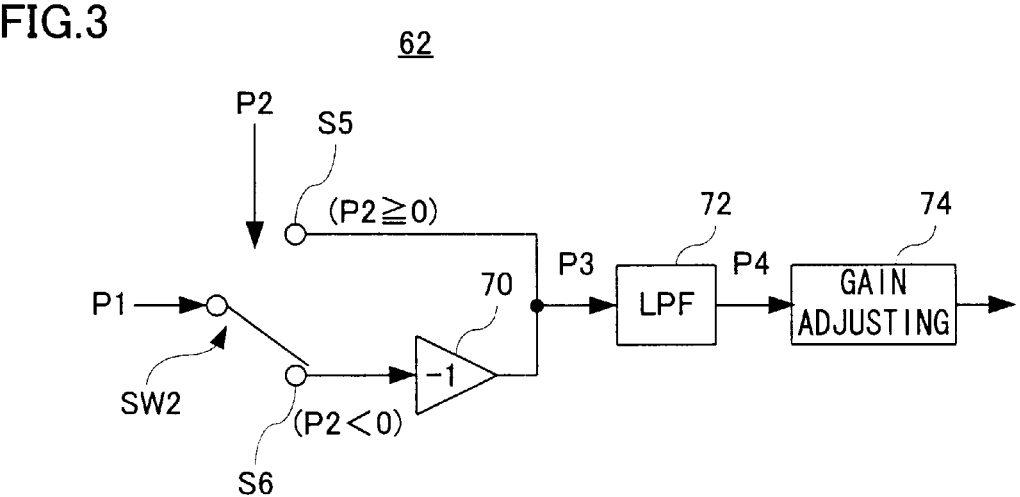
FIG. 3 is a block diagram showing functional structure of a phase difference detecting portion and gain adjusting portion shown in FIG. 2.

Functional structure of the phase difference detecting and the gain adjusting portion 62 is represented as in FIG. 3. The output signal P1 is directly input to a low-path filter (LPF) 72 via the switch SW2 or input thereto after being inverted by an inverter 70. The switch SW2 is switched in response to a polarity of the output signal P2. In the LPF 72, an input signal P3 which is the output signal P1 being directly or invertedly input is smoothed, and the smoothed input signal P3, that is, a smoothed signal P4 is input to a gain adjusting portion 74. That is, a correlation signal (input signal P3) correlated with the phase difference between the output signal P1 and the output signal P2 is generated, and a DC component (smoothed signal P4) of the correlation signal is extracted by the LPF 72.

Figure 4:
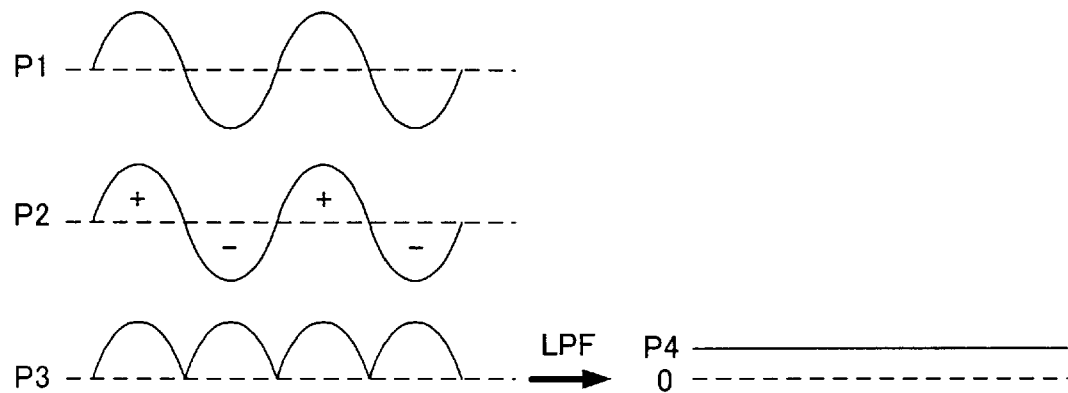
FIGS. 4A–4C is a waveform chart showing an output signal P1, an output signal P2, an output signal P3, and a smoothed signal P4 shown in FIG. 2 and FIG. 3.
Figure 4:
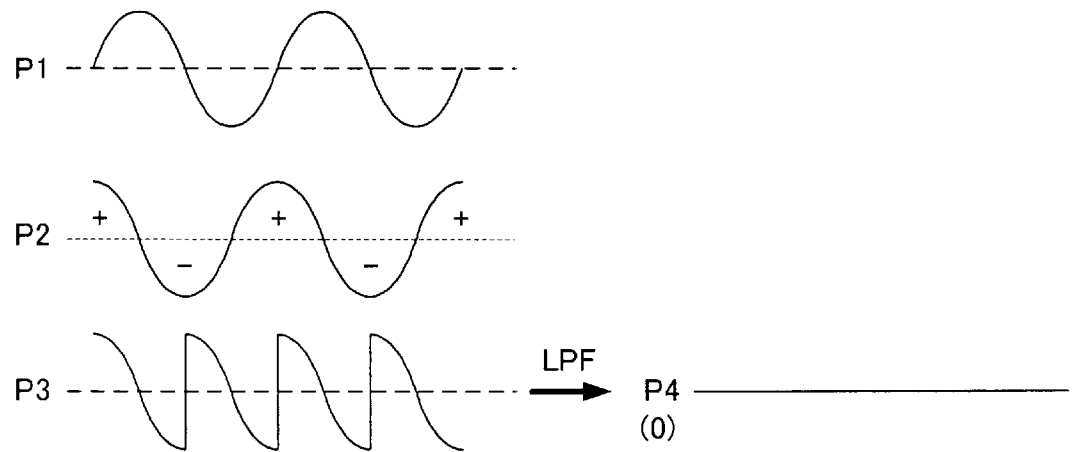
Figure 4:
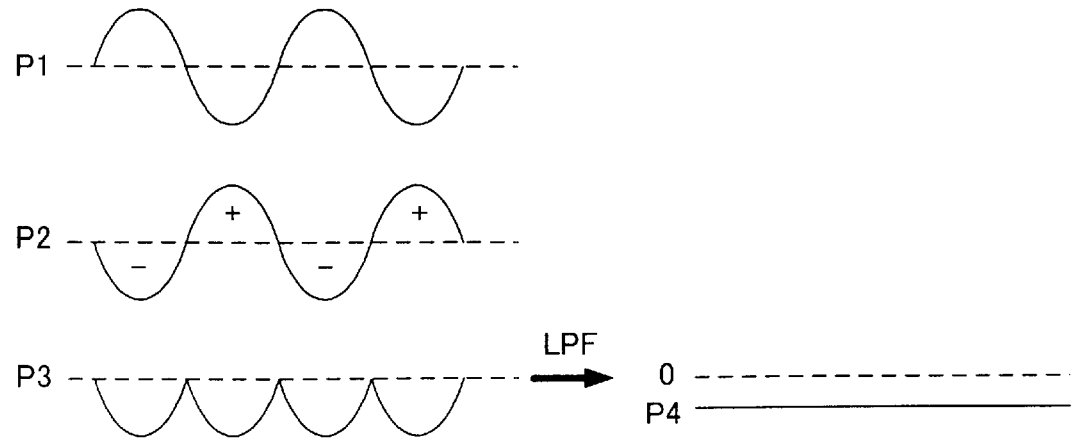

As shown in FIG. 4(A), for example, in a case that there is no phase difference between the output P1 and the output P2 (0 degree), the smoothed signal P4 (phase difference), that is, the DC component of the input signal P3 becomes larger (higher) than a 0 level. That is, the polarity is positive.

Furthermore, as shown in FIG. 4(B), in a case that the phase difference between the output signal P1 and the output signal P2 is 90 degrees, that is, if the output signal P2 is delayed with respect to the output signal P1 by 90 degrees, the DC component of the input signal P3 becomes the 0 level.

Furthermore, as shown in FIG. 4(C), in a case that the phase difference between the output signal P1 and the output signal P2 is 180 degrees, that is, if the output signal P2 is delayed with respect to the output signal P1 by 180 degrees, the DC component of the input signal P3 becomes smaller (lower) than the 0 level. That is, the polarity is negative.

Thus, it is possible to generate not only the input signal P3 but also the smoothed signal P4 in accordance with the phase difference between the output signal P1 and the output signal P2, and the gain is to be adjusted by using the smoothed signal P4 in a gain adjusting portion 74 (described later). In this embodiment, the BPF 56 having a center frequency which is the target frequency f (in this embodiment, 2 kHz) is used, and it is possible to say that an appropriate loop gain has been adjusted at the target frequency f, that is, an appropriate reproduction gain has been determined when the phase difference between the output signal P1 and the output signal P2 is 90 degrees. That is, the loop gain is adjusted in such a manner as to render the phase difference 90 degrees, and as shown in FIG. 2, the phase difference detecting and the gain adjusting portion 62 is constituted in order that a level of the smoothed signal P4 at this time is rendered the target level (0 level).

The gain adjusting portion 74, as described above, generates the DC component of the input signal P3, that is, an adjusting signal in correspondence to a level of the smoothed signal P4, and inputs the adjusting signal into the amplifier 52 shown in FIG. 2. Therefore, the gain (loop gain) of the amplifier 52 is adjusted. More specifically, as shown in FIG. 4(A) and FIG. 4(C), where the smoothed signal P4 is distant from the 0 level, the loop gain is controlled in such a manner that the level of the smoothed signal P4 is brought closer to the 0 level. That is, if the level of the smoothed signal P4 is larger than the 0 level (polarity is positive), the loop gain is rendered larger (increased), and if the level of the smoothed signal P4 is smaller than the 0 level (polarity is negative), the loop gain is rendered smaller (descended).

Figure 5:
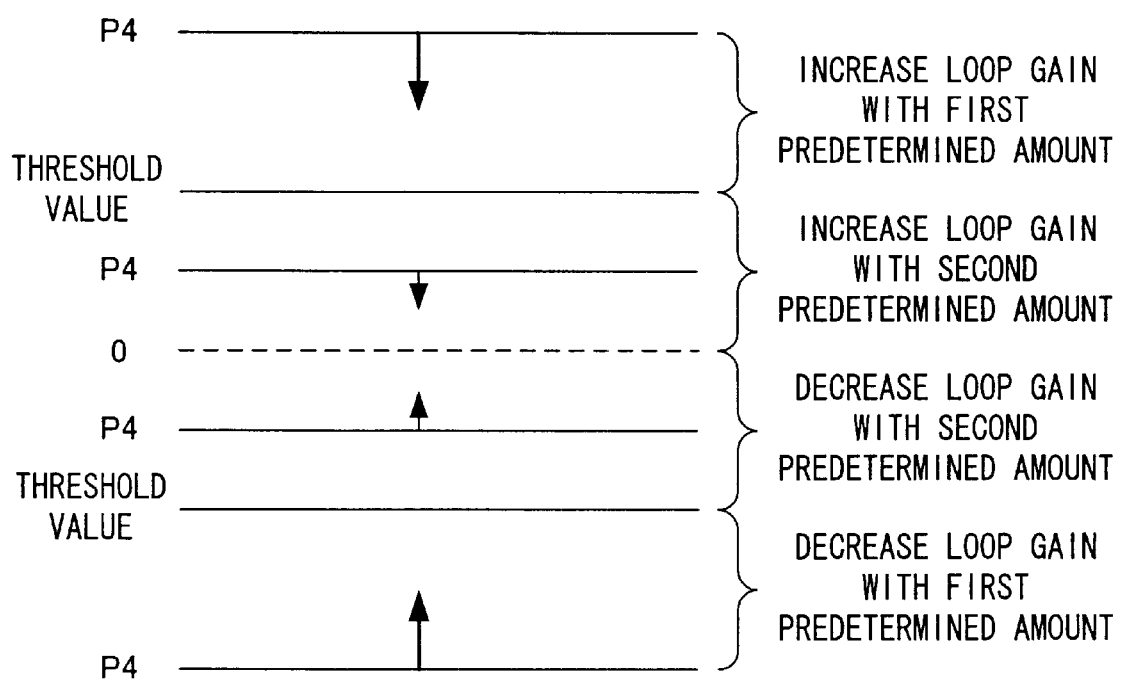
FIG. 5 is a waveform chart showing a relationship between the smoothed signal P4 and a predetermined threshold value.

However, in this embodiment, as shown in FIG. 5, in a case that the level of the smoothed signal P4 exceeds a predetermined threshold value, the loop gain is increased or decreased with a first predetermined amount so that the level of the smoothed signal P4 is greatly brought closer to the 0 level, and if the level of the smoothed signal P4 is equal to or less than the predetermined threshold value, the loop gain is increased or decreased with a second predetermined amount which is smaller than the first predetermined amount so that the level of the smoothed signal P4 is gradually brought closer to the 0 level.

That is, in a case that the level of the smoothed signal P4 is largely distant from the 0 level, the loop gain is adjusted with a wide adjusting width, and in a case that the level of the smoothed signal P4 is slightly distant from the 0 level, the loop gain is controlled by a small adjusting width. Therefore, it is possible to appropriately control the loop gain with a short time. In addition, in a case that the level of the smoothed signal P4 is in a vicinity of the 0 level, the amount of increase or decrease of the loop gain is rendered small, and thus it is possible to set the appropriate loop gain.

Note that in this embodiment, the predetermined threshold value (level) is set to a ½ value (level) of a crest value or peak value of the sine wave, i.e. the output signal P1.

More specifically, the DSP core 36a determines the reproduction gain by carrying out processes according to flowcharts shown in FIG. 6 to FIG. 9. When the disk 22 is attached (exchanged) to the disk apparatus 10, for example, a process of determining the reproduction gain is started, and the loop gain of the servo loop for determining the reproduction gain is set to ±0 dB in a step S1 shown in FIG. 6. At this time, the DSP core 36a stores a loop gain value (gain value) of ±0 dB in a working area (not shown) of a memory 36b provided within the DSP 36.

Note that in determining the reproduction gain, as shown in FIG. 2, the switch SW1 is switched to the terminal S3, and the servo loop for determining the reproduction gain is formed.

In a succeeding step S3, an adjusting width W1 of the loop gain is rendered 2 steps (first predetermined amount). For example, in this embodiment, a maximum adjusting width of the gain (loop gain) of the amplifier 52 is ±6 dB, the loop gain is adjusted by dividing this width into 10 stages (steps) on one side, and therefore, one (1) step is equivalent to 0.6 dB. In addition, the adjusting width W1 is a default value previously determined upon shipment by a manufacturer, and etc.

Next, a counter 36c provided within the DSP 36 is reset in a step S5, and an adjusting width W2 is set to the same adjusting amount as the adjusting width W1 in a step S7. That is, the adjusting width W2 is rendered two (2) steps (or one (1) step). The adjusting width W2 is different from the adjusting width W1, and which is a temporary adjusting width changed at a suitable timing in the gain adjusting process.

Then, in a step S9, a smoothed signal generating process (hereinafter briefly referred to as "generating process") described later in detail is carried out, and the counter 36c is incremented in a step S11. In a succeeding step S13, it is determined whether or not a DC component of the correlation signal, that is, an absolute value of the smoothed signal P4 is equal to or less than a predetermined threshold value.

Note that the predetermined threshold value has a same value (same level) on either a positive side (more than 0 level) or a negative side (less than 0 level) as described by using FIG. 5, and it is determined whether or not the absolute value of the smoothed signal P4 is equal to or less than the predetermined threshold value by using the absolute value of the predetermined threshold value.

Figure 7:
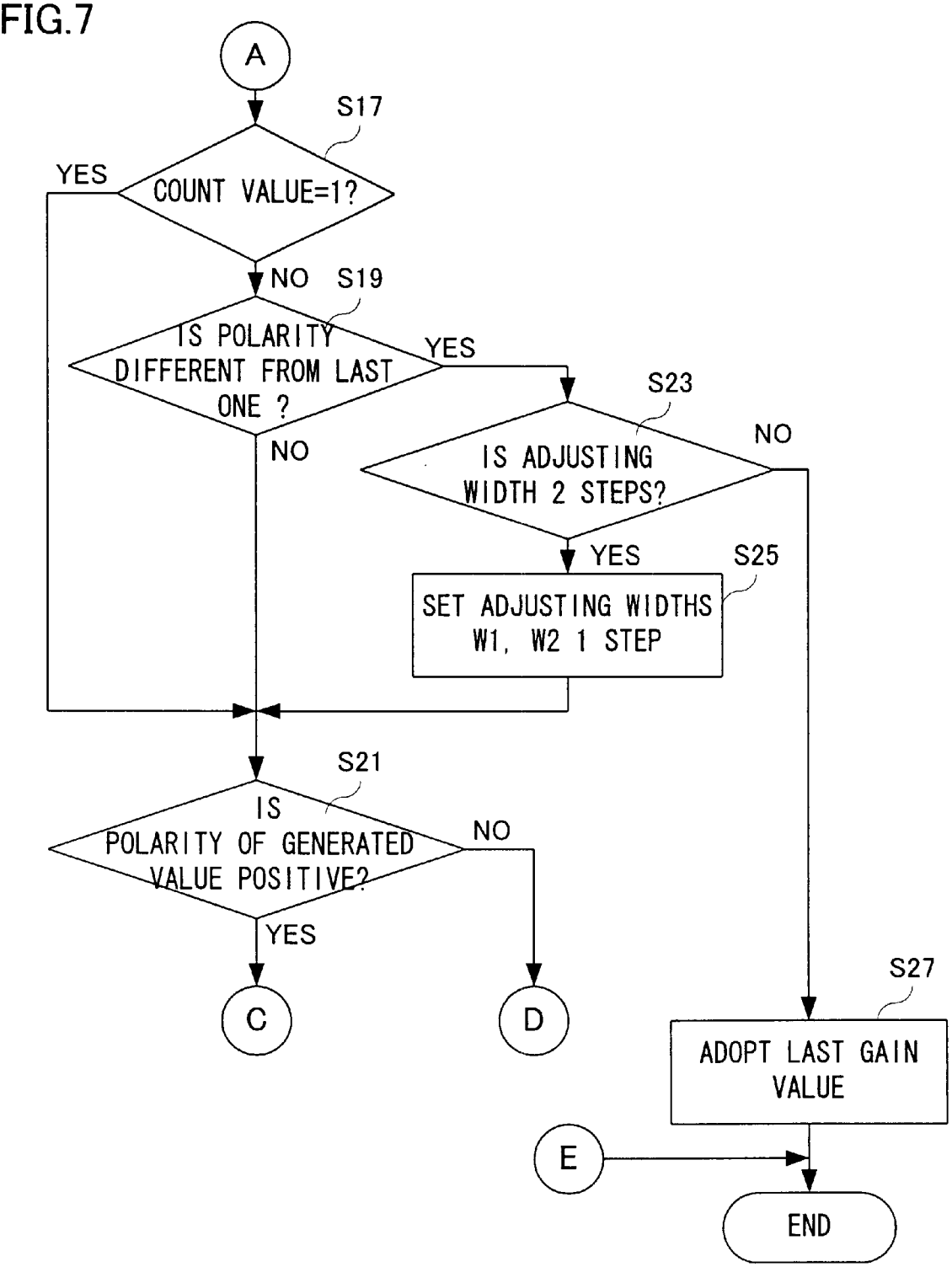
FIG. 7 is a flowchart showing another portion of the determination process of a reproduction gain of a DSP core shown in FIG. 1 embodiment.

If "NO" is determined in the step S13, that is, if the absolute value of the smoothed signal P4 exceeds the predetermined threshold value, the process directly proceeds to a step S17 shown in FIG. 7, determining that it is required to greatly increase or decrease the loop gain. On the other hand, if "YES" is determined in the step S13, that is, if the absolute value of the smoothed signal P4 is equal to or less than the predetermined threshold value, the process proceeds to the step S17 after setting the adjusting width W2 of the loop gain to one (1) step (second predetermined amount) in a step S15, determining that it is required to gradually increase or decrease the loop gain.

In the step S17 shown in FIG. 7, it is determined whether or not the counter value of the counter 36c is 1. That is, it is determined whether or not the generating process is a first time. If "YES" is determined in the step S17, that is, if the count value is 1, the process directly proceeds to a step S21, determining that the generating process is the first time. On the other hand, if "NO" is determined in the step S17, that is, if the count value is not 1, it is determined whether or not the polarity of the smoothed signal P4 obtained (generated) in the last generating process is different from the polarity of the smoothed signal P4 generated this time in a step S19, determining that the generating process has been carried out more than twice. That is, it is determined whether or not the polarity of the smoothed signal has been changed.

If "NO" is determined in the step S19, that is, unless the polarity of the smoothed signal P4 has been changed, the process proceeds to a step S21. On the other hand, if "YES" is determined in the step S19, that is, if the polarity of the smoothed signal P4 is changed, it is determined whether or not the adjusting width W2 of the loop gain is 2 steps in a step S23. If "YES" is determined in the step S23, that is, if the adjusting width W2 of the loop gain is 2 steps, the process proceeds to, the step S21 after setting each of the adjusting width W1 and the adjusting width W2 of the loop gain to 1 step in a step S25.

Note that the reason why both of the adjusting width W1 and the adjusting width W2 are set to 1 step is that the adjusting width W2 is rendered identical to the adjusting width W1 in the step S7, and unless the adjusting width W1 is rendered 1 step in this step S25, the loop gain is always to be increased or decreased (adjusted) by an increasing or decreasing amount of the 2 steps.

On the other hand, if "NO" is determined in the step S23, that is, if the adjusting width W2 of the loop gain is 1 step, the process is ended after adopting the loop gain adjusted at a time that the last generating process is carried out in a step S27. That is, the DSP core 36a calculates the gain value of last time from the gain value stored in the working area of the memory 36b, thereby to determine (set) the gain value as the reproduction gain, and also to store the calculated gain value in a memory area (not shown) provided within the same memory 36b. More specifically, in a case that the loop gain is added immediately before the generating process of this time is carried out, 1 step (0.6) is subtracted from the gain value stored in the working area, and on the contrary, in a case that the loop gain is subtracted, 1 step is added to the gain value stored in the working area, and thus, the gain value of last time is calculated.

Thus, the gain value stored in the memory area of the memory 36b is a value of the reproduction gain particular to the disk 22, and held until the disk 22 is exchanged.

Thus, in a case that the polarity of the smoothed signal P4 differs before and after the gain adjustment when the loop gain is adjusted with the second predetermined amount (1 step), that is, if the polarity of the smoothed signal P4 generated in the last generating process and the polarity of the smoothed signal P4 generated this time are reverse in polarity, it is possible to determine that the 0 level shown in FIG. 4(A) to FIG. 4(B) and FIG. 5 is crossed by the smoothed signal P4. Therefore, in this case, the gain value of last time is to be adopted, determining that the loop gain (gain value) adjusted when the last generating process is carried out is appropriate. Note that the gain value of this time may be adopted in such a case.

In the step S21, it is determined whether or not the polarity of the generated value is positive. That is, it is determined whether or not the polarity of the smoothed signal P4 generated this time in the generating process in the step S9 is positive. If "YES" is determined in the step S21, that is, if the polarity of the smoothed signal P4 is positive, the process proceeds to a step S29 shown in FIG. 8. On the other hand, if "NO" is determined in the step S21, that is, if the polarity of the smoothed signal P4 is negative, the process proceeds to a step S39 shown in FIG. 8.

Figure 8:
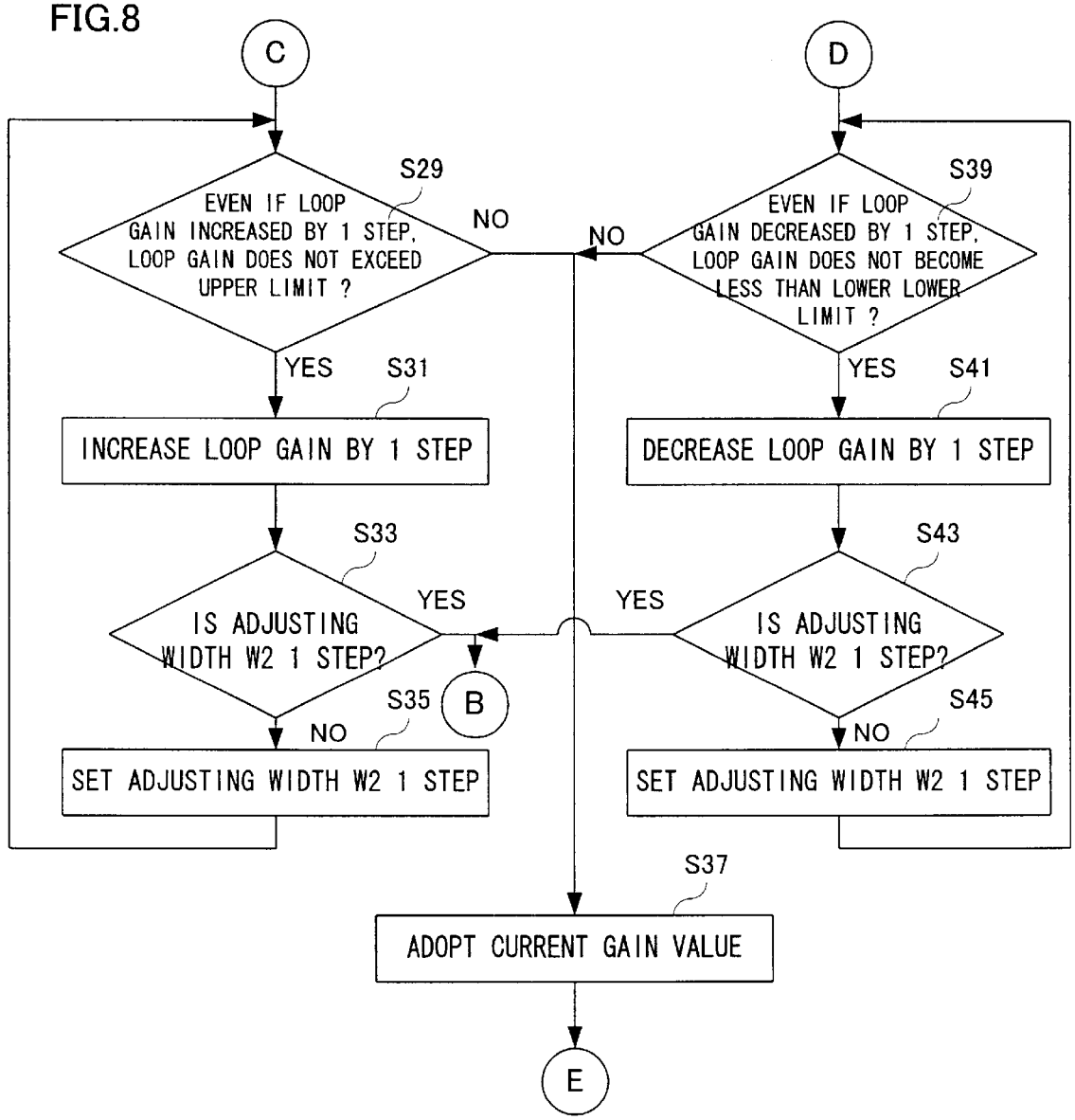
FIG. 8 is a flowchart showing still another portion of the determination process of a reproduction gain of a DSP core shown in FIG. 1 embodiment.

In the step S29 shown in FIG. 8, it is determined whether or not an upper limit (+6 dB) is not exceeded even if the loop gain is increased by 1 step (0.6 dB). If "NO" is determined in the step S29, that is, if the upper limit is exceeded, the gain value of the current time is adopted in a step S37, and the process is ended as shown in FIG. 7. That is, the DSP core 36a determines the loop gain as the reproduction gain, and the process is ended by storing the gain value stored in the working area into the memory area.

On the other hand, if "YES" is determined in the step S29, that is, if the upper limit is not exceeded, the loop gain is added (increased) by 1 step in a step S31. That is, the DSP core 36a increases the loop gain by 0.6 dB, and also adds 0.6 (dB) to the gain value within the working area. In a succeeding step S33, it is determined whether or not the adjusting width W2 is set to 1 step. If "YES" is determined in the step S33, that is, if the adjusting width W2 is set to 1 step, the process returns to the step S9 shown in FIG. 6. On the other hand, if "NO" is determined in the step S33, that is, if the adjusting width W2 is not set to 1 step, the process returns to the step S29 after setting the adjusting width W2 to 1 step in a step S35.

Thus, where the adjusting width W2 is set to 1 step, the process moves to a next generating process after increasing the loop gain by 1 step. However, if the adjusting width W2 is set to 2 steps, the adjusting width W2 is set to 1 step in the step S35 if and when "NO" is determined in the step S33, and the processes of steps S29 to S33 are once again carried out because it requires to move to the next generating process after increasing the loop gain by 2 steps.

Furthermore, in a step S39, it is determined whether or not the loop gain becomes less than an lower limit (−6 dB) even if 1 step (0.6 dB) is subtracted. If "NO" is determined in the step S39, that is, if the loop gain falls below the lower limit, the process is ended after adopting the gain value of the current time in the step S37. On the other hand, if "YES" is determined in the step S39, that is, if the loop gain is not less than the lower limit, the loop gain is subtracted (lowered) by 1 step in a step S41. That is, the DSP core 36a lowers the loop gain by 0.6 dB, and also subtracts 0.6 (dB) from the gain value within the working area.

In a succeeding step S43, it is determined whether or not the adjusting width W2 is set to 1 step. If "YES" is determined in the step S43, that is, if the adjusting width W2 is set to 1 step, the process directly returns to the step S9. On the other hand, if "NO" is determined in the step S43, that is, if the adjusting width W2 is not set to 1 step, the process returns to the step S39 after setting the adjusting width to 1 step in a step S45.

Thus, where the adjusting width W2 is set to 1 step, the process moves to a next generating process after lowering the loop gain by 1 step. However, if the adjusting width W2 is set to 2 steps, the adjusting width W2 is set to 1 step in the step S45 if "NO" is determined in the step S43, and the processes of steps S39 to S43 are once again carried out because it requires to move to the next generating process after lowering the loop gain by 2 steps.

Figure 6:
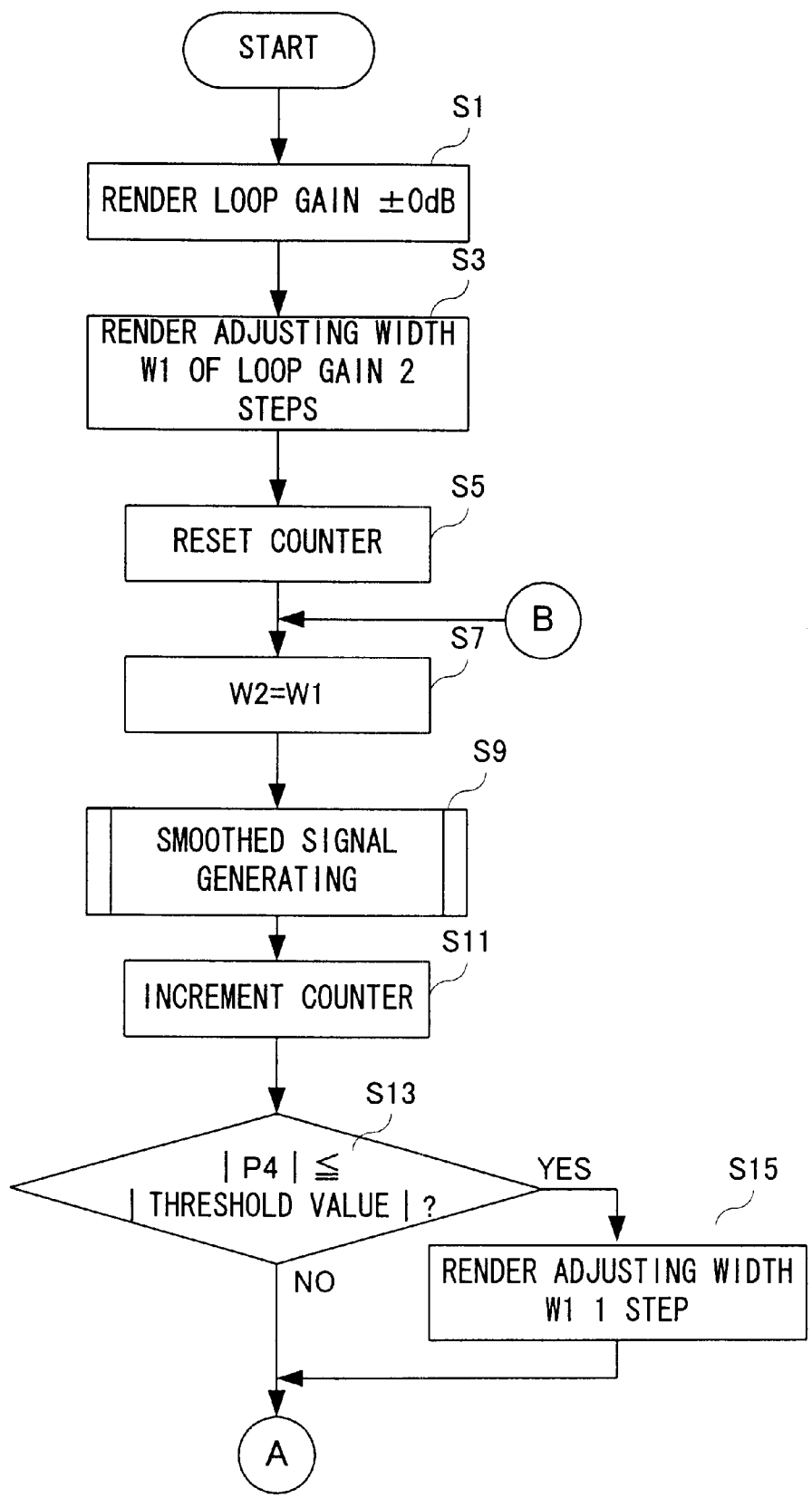
FIG. 6 is a flowchart showing a portion of a determination process of a reproduction gain of a DSP core shown in FIG. 1 embodiment.
Figure 9:
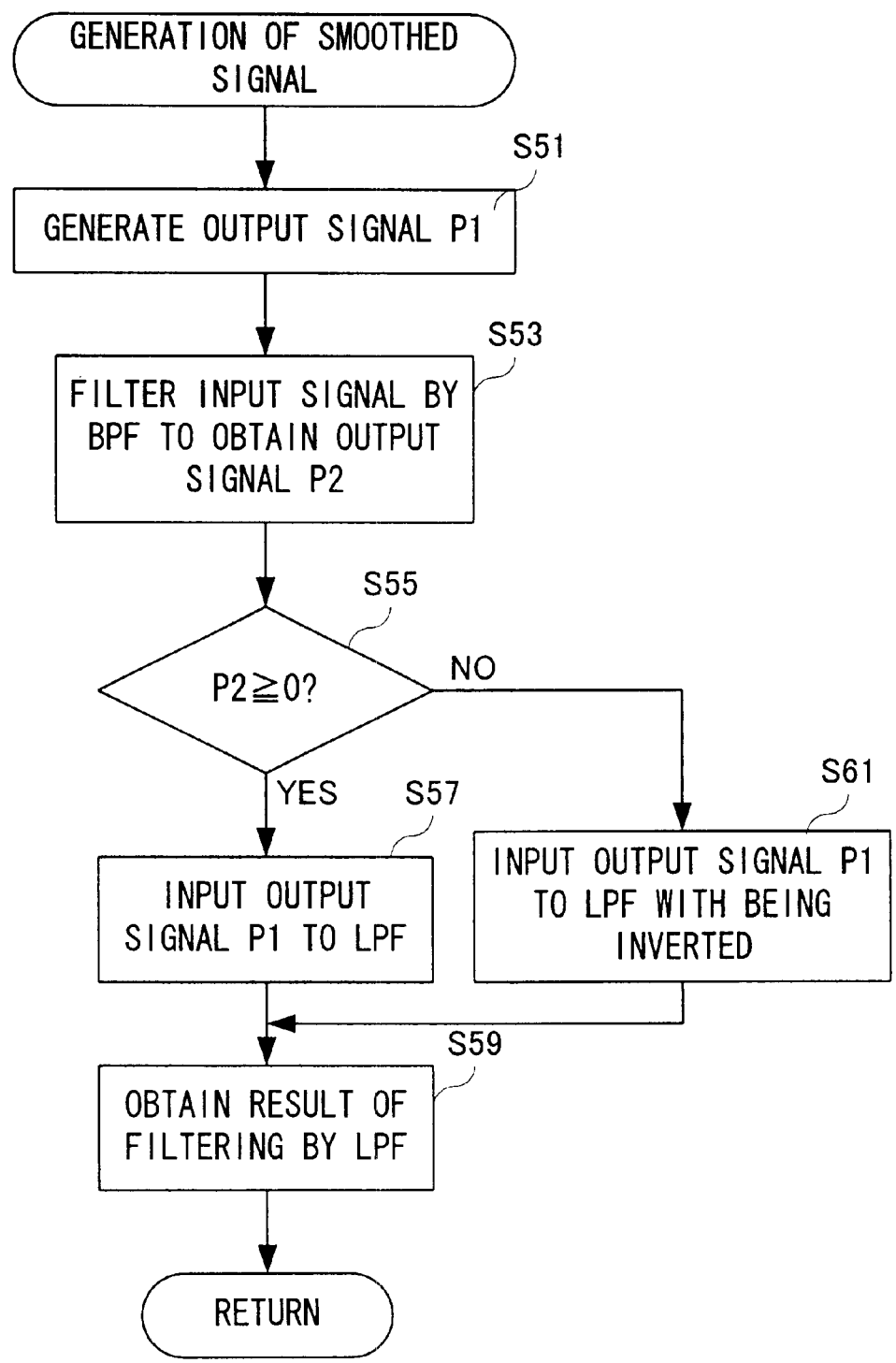
FIG. 9 is a flowchart showing a smoothed signal generating process of a DSP core shown in FIG. 1 embodiment.
Figure 10:
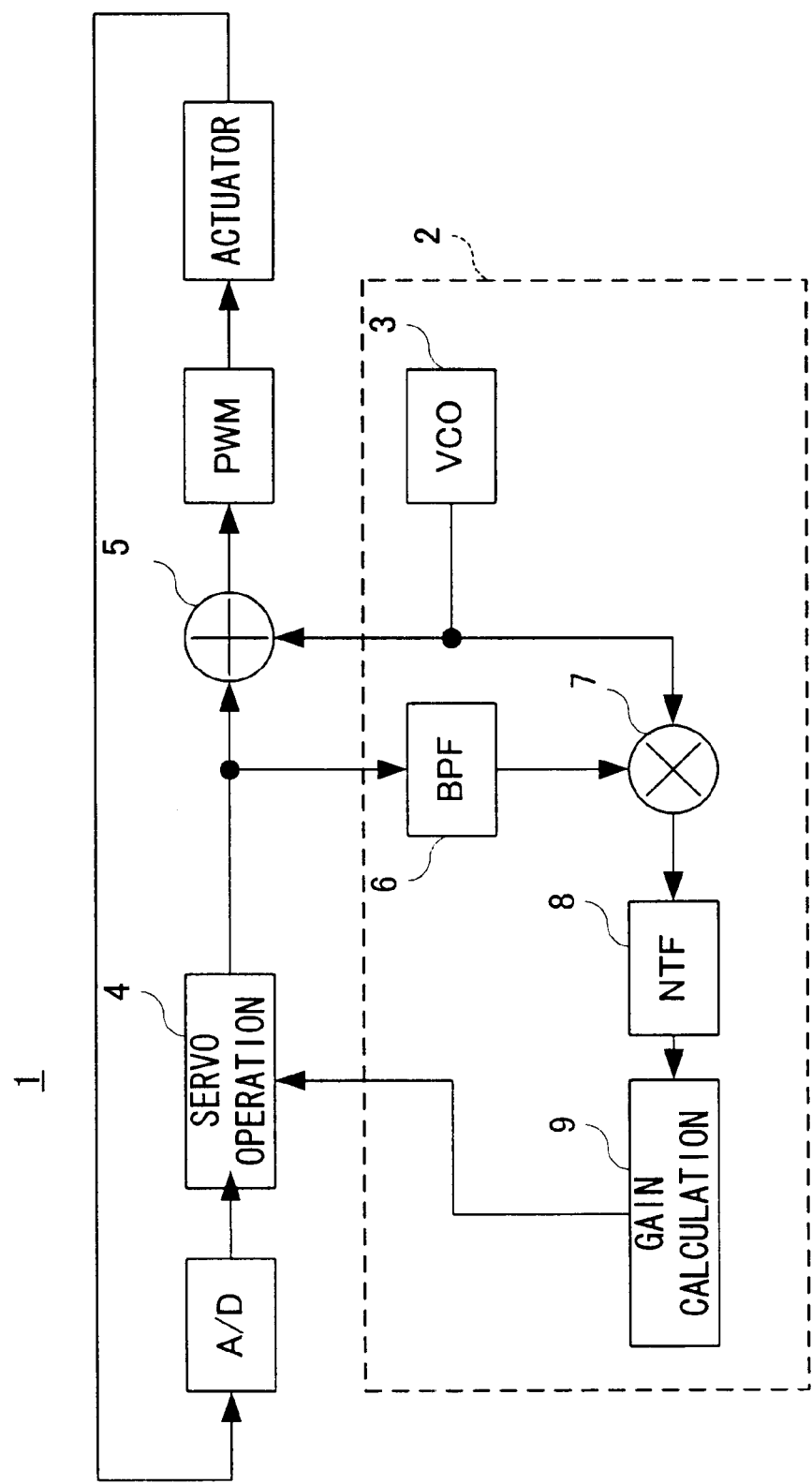
FIG. 10 is block diagram showing one example of a conventional servo control apparatus.

Referring to FIG. 9, when the generating process shown in the step S9 in FIG. 6 is started, the DSP core 36a generates a disturbance (sine wave) of a target frequency f, that is, an output signal P1 in a step S51, and obtains an output signal P2 having an input signal filtered in the BPF 56 in a step S53.

Note that as described above, a frequency component of the target frequency f is extracted by the BPF 56 because the center frequency of the BPF 56 is set to the target frequency f.

In a succeeding step S55, it is determined whether or not the output signal P2 is equal to or more than 0. More specifically, it is determined whether or not the polarity of the output signal P2 is positive (0 is included) or negative. If "YES" is determined in the step S55, that is, if the polarity of the output signal P2 is positive, the output signal P1 is directly input to an LPF 72 in a step S57, and the process is returned after obtaining a result of the filtering by the LPF 72, that is, a generated smoothed signal P4 in a step S59.

That is, the process is returned after storing the generated smoothed signal P4, that is, a numerical value (generated value) of a DC component of the correlation signal in the working area of the memory 36b. However, the numerical value (generated value) of the DC component of the correlation signal is stored in the working area of the memory 36b at every time that the generating process is carried out, and the entire history thereof is retained. Therefore, it is possible to determine whether or not the polarity is different from the last one in the step S19 in FIG. 7.

Note that in regard to the history, it may be possible to retain at least the generated value of last time and the generated value of this time.

On the other hand, if "NO" is determined in the step S55, that is, if the output signal is negative, the output signal P1 is inverted and input into the LPF 72 in a step S61, and then the process proceeds to the step S59.

That is, the DSP core 36a performs a sampling of the output signal P1 obtained in the step S57 or the inverted output signal P1 obtained in the step S61 for a predetermined time period, and a sampled waveform (input signal P3) is integrated so as to generate the smoothed signal P4.

Note that in this embodiment, the LPF 72 is to pass a frequency component equal to or less than 10 Hz in order to securely obtain (generate) the DC component of the correlation signal, that is, the smoothed signal P4. Therefore, the predetermined time period is set to a time until the LPF 72 becomes stable ($1/10$ Hz=100 msec), thus securing a trustworthiness or a reliability of the obtained DC component.

In addition, in this embodiment, determining processes of the reproduction gain described by using FIG. 6 to FIG. 9 are carried out from when the disk 22 is attached until the pick-up 12 tracks-on for the first time, and as described above, the determined reproduction gain (gain value) is stored (retained) in the memory area of the memory 36a until the disk 22 is changed.

Furthermore, if the reproduction gain is determined, the switch SW1 shown in FIG. 2 is switched to the terminal S2, during the reproduction of the disk 22, the DSP core 36a controls the focus servo loop and the tracking servo loop by using the determined reproduction gain.

According to this embodiment, if the DC component of the correlation signal is more than the predetermined threshold value, the loop gain is greatly increased or decreased, in contrary, if the DC component is equal to or less than the predetermined threshold value, the loop gain is gradually increased or decreased, thus possible to adjust the loop gain in a short time. In addition, it is also possible to set an appropriate loop gain. That is, it is possible to determine (set) an appropriate reproduction gain in a short time.

Note that in this embodiment, although the loop gain is adjusted by dividing a maximum adjusting width (±6 dB) of the gain of the amplifier 52 into ten steps on one side, it may be not only possible to increase the number of steps to be divided, but also decrease the number. However, in order to set an appropriate loop gain, it is not preferable to reduce the number of steps to be divided.

In addition, in this embodiment, although the loop gain is increased or decreased (adjusted) by 2 steps by 2 steps (first predetermined amount) or 1 step by 1 step (second predetermined amount) depending upon whether or not the DC component of the correlation signal exceeds the predetermined threshold value, it may be appropriate if the first predetermined amount is set larger than the second predetermined amount, and the second predetermined amount has appropriate value capable of appropriately setting the loop gain. That is, the first predetermined amount and the second predetermined amount are respectively set in accordance with a result of an experiment carried out in advance, and etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A servo control apparatus which determines a reproduction gain of a focus servo loop or a tracking servo loop of a disk apparatus, comprising:

a phase difference detecting means for detecting a phase difference between an input sine wave and a sine wave being fed-back;

an adjusting means for adjusting a loop gain of a servo loop for determining said reproduction gain in accordance with said phase difference;

a generating means for generating a correlation signal correlated with said phase difference at every time that said loop gain is adjusted by said adjusting means;

a determining means for determining whether or not a DC component of said correlation signal generated by said generating means exceeds a predetermined threshold value;

an adjusting amount setting means for setting an adjusting amount of said loop gain to a first predetermined amount when it is determined that the DC component of said correlation signal exceeds the predetermined threshold value, and setting said adjusting amount to a second predetermined amount smaller than said first predetermined amount when it is determined that the DC component of said correlation signal is equal to or smaller than said the predetermined threshold value;

a polarity detecting means for detecting a polarity of the DC component of said correlation signal generated by said generating means;

a polarity comparing means for comparing said polarity of this time detected by said polarity detecting means and said polarity of last time; and a gain determining means for determining said loop gain adjusted last time or said loop gain adjusted this time as said reproduction gain when a comparing result of said polarity comparing means indicates a reverse in polarity and also said second predetermined amount is set.

2. A servo control apparatus which determines a reproduction gain of a focus servo loop or a tracking servo loop of a disk apparatus, comprising:

a phase difference detecting means for detecting a phase difference between an input sine wave and a sine wave being fed-back;

an adjusting means for adjusting a loop gain of a servo loop for determining said reproduction gain in accordance with said phase difference;

a determining means for determining whether or not a DC component of a correlation signal correlated with said phase difference exceeds a predetermined threshold value; and an adjusting amount setting means for adjusting an adjusting amount of said loop gain in response to a determining result of said determining means.

3. A servo control apparatus according to claim 2, wherein said adjusting amount setting means sets said adjusting amount to a first predetermined amount when it is determined that the DC component of said correlation signal exceeds the predetermined threshold value, and sets said adjusting amount to a second predetermined amount smaller than said first predetermined amount when it is determined that the DC component of said correlation signal is equal to or less than said predetermined threshold value.

4. A servo control apparatus according to claim 3, further comprising
- a generating means for generating said correlation signal at every time that said loop gain is adjusted by said adjusting means.

5. A servo control apparatus according to claim 4, further comprising:
- a polarity detecting means for detecting a polarity of the DC component of said correlation signal generated by said generating means;
- a polarity comparing means for comparing said polarity of this time detected by said polarity detecting means and said polarity of last time; and
- a gain determining means for determining said loop gain adjusted last time or said loop gain adjusted this time as said reproduction gain when at least a determining result of said polarity comparing means indicates a reverse in polarity.

6. A servo control apparatus according to claim 5, wherein said gain determining means determines said loop gain adjusted last time or said loop gain adjusted this time as said reproduction gain when said comparing result is a reverse in polarity, and also said adjusting amount is the second predetermined amount.

7. A gain adjusting method in a servo control apparatus which determines a reproduction gain of a focus servo loop or a tracking servo loop of a disk apparatus, including following steps of:
- (a) detecting a phase difference between an input sine wave and a sine wave being fed-back;
- (b) generating a correlation signal correlated with said phase difference;
- (c) determining whether or not a DC component of said correlation signal exceeds a predetermined threshold value; and
- (d) adjusting a loop gain of a servo loop for determining said reproduction gain with a first predetermined amount when it is determined that the DC component of said correlation signal exceeds a predetermined threshold value, and adjusting said loop gain with a second predetermined amount smaller than said first predetermined amount when it is determined that the DC component of said correlation signal is equal to or less than the predetermined threshold value.

8. A gain adjusting method according to claim 7, further comprising a step of
- (e) determining said loop gain adjusted last time or said loop gain adjusted this time as said reproduction gain when at least a polarity of the DC component of said correlation signal of last time and a polarity of the DC component of said correlation signal of this time indicate a reverse in polarity as a result of adjusting said loop gain with said first predetermined amount or said second predetermined amount.

9. A gain adjusting method according to claim 8, wherein in said step (e), said loop gain adjusted last time or said loop gain adjusted this time is determined as said reproduction gain when said reverse polarity, and also said loop gain is adjusted with said second predetermined amount.

* * * * *